May 5, 1959  J. W. TONE ET AL  2,885,527
REGULATING DEVICE FOR ELECTRICAL VAPORIZER
Filed Oct. 4, 1956  2 Sheets-Sheet 1

INVENTORS:
JOHN W. TONE &
LOUIS BENTZMAN
BY
Connolly and Hutz
ATTORNEYS

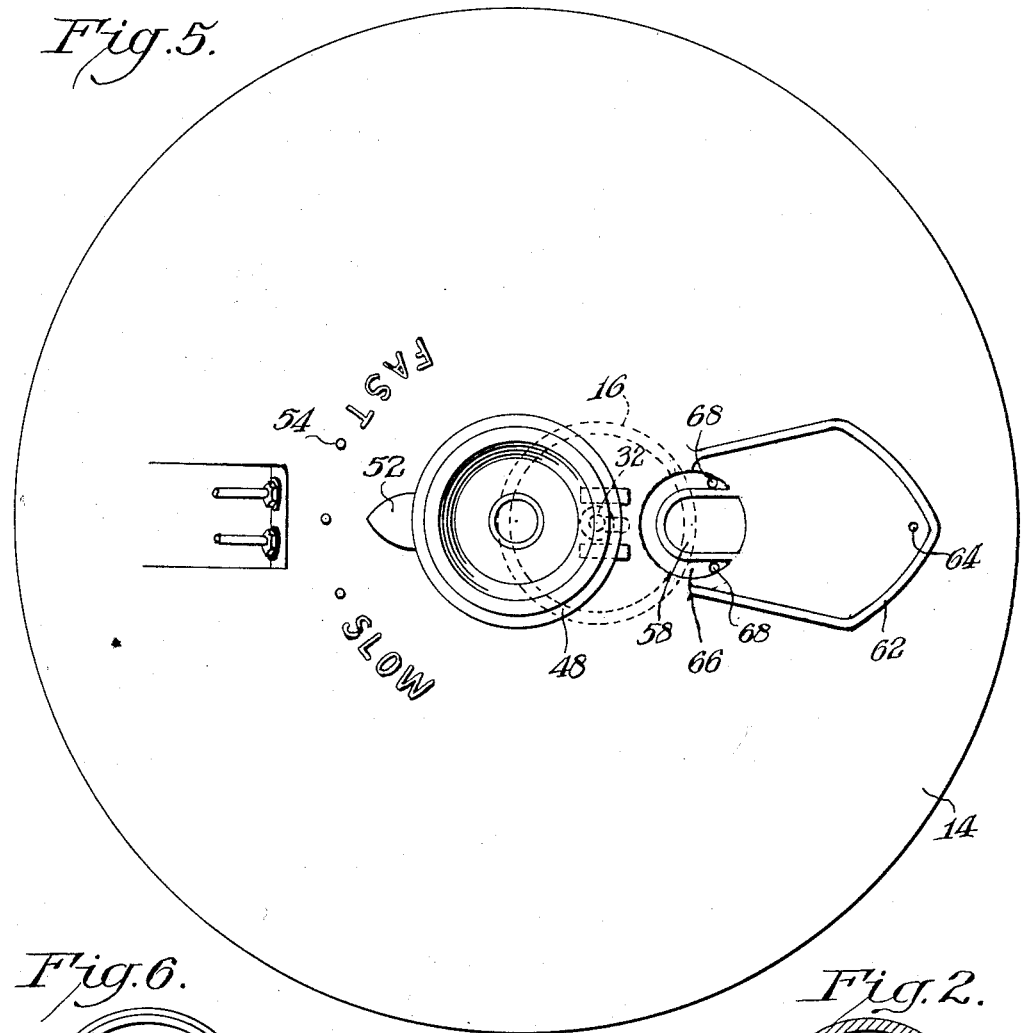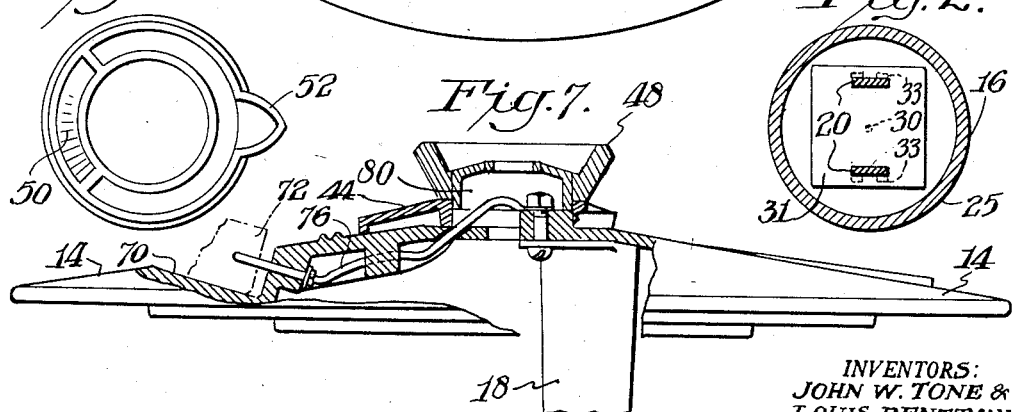

United States Patent Office 2,885,527
Patented May 5, 1959

2,885,527
REGULATING DEVICE FOR ELECTRICAL VAPORIZER

John W. Tone, Manhasset, N.Y., and Louis Bentzman, Oak Hill, Del., assignors to Saxony Electronics, Inc., Wilmington, Del., a corporation of Delaware Application October 4, 1956, Serial No. 613,940

5 Claims. (Cl. 219—40)

This invention relates to a device for regulating the operating rate of an electrical vaporizer, and more particularly to such a regulating device which permits the normal operating cycle of an electrical vaporizer between water additions to be lengthened.

Electrical vaporizers are operated under varying conditions which require correspondingly varying rates of vapor or steam production. During normal daytime operation, when doors and windows may be frequently opened, a high rate of vapor production is desirable. During the night, however, air conditions are comparatively tranquil, and it is most desirable to avoid the necessity of awaking to refill the water reservoir. A slower rate of vapor production, accordingly, permits a vaporizer of compact size to operate through the night.

Various regulating devices which vary the electrical input to the vaporizer have been proposed. These devices, however, do not operate satisfactorily unless elaborate and expensive precautions are taken to compensate for falling water level and the resultant variation in submergence of electrodes and increase of electrolyte concentration.

An object of this invention is to provide a simple, economical and dependable regulating device for varying the rate of vapor production of an electrical vaporizer.

In accordance with this invention, a manually operable valve is incorporated within the vapor outlet orifice of an electrical vaporizer. Adjustment of this valve concomitantly varies the vapor back pressure and water level within the well of the vaporizer which is vertically positioned within a water reservoir. This change of water level varies the degree of submergence of a vertical pair of electrodes which results in a corresponding variation in the rate of vapor production. A water inlet means is provided at or near the bottom of the well. This inlet means is restricted in order to prevent excessive cycling as a result of adjustment of the valve, but includes passages large enough to prevent plugging.

An extremely simple and economical structure for this invention includes a piston and ported sleeve vertically positioned in the cover of the vaporizer. The stem of the valve piston projects to engage a cam ring rotatably mounted on the upper surface or the cover. This ring is conveniently rotated to vary the size of the vapor discharge orifice which accordingly varies the rate of vapor production. Efficient inlet means may include an orifice, just large enough to prevent plugging, which is shielded by a baffle plate.

Novel features and advantages of the present invention will become apparent to one skilled in the art from a reading of the following description in conjunction with the accompanying drawings in which similar reference characters refer to similar parts and wherein:

Fig. 2 is a cross-sectional view taken through Fig. 1 along the line 2—2 and looking in the direction of the arrows;

Fig. 5 is an upper plan view of the cover of the embodiment shown in Fig. 1;

Fig. 6 is a bottom plan view of a portion of the embodiment shown in Fig. 1; and Fig. 7 is a cross-sectional view taken through Fig. 4 along the line 7—7 and looking in the direction of the arrows.

Figure 1:
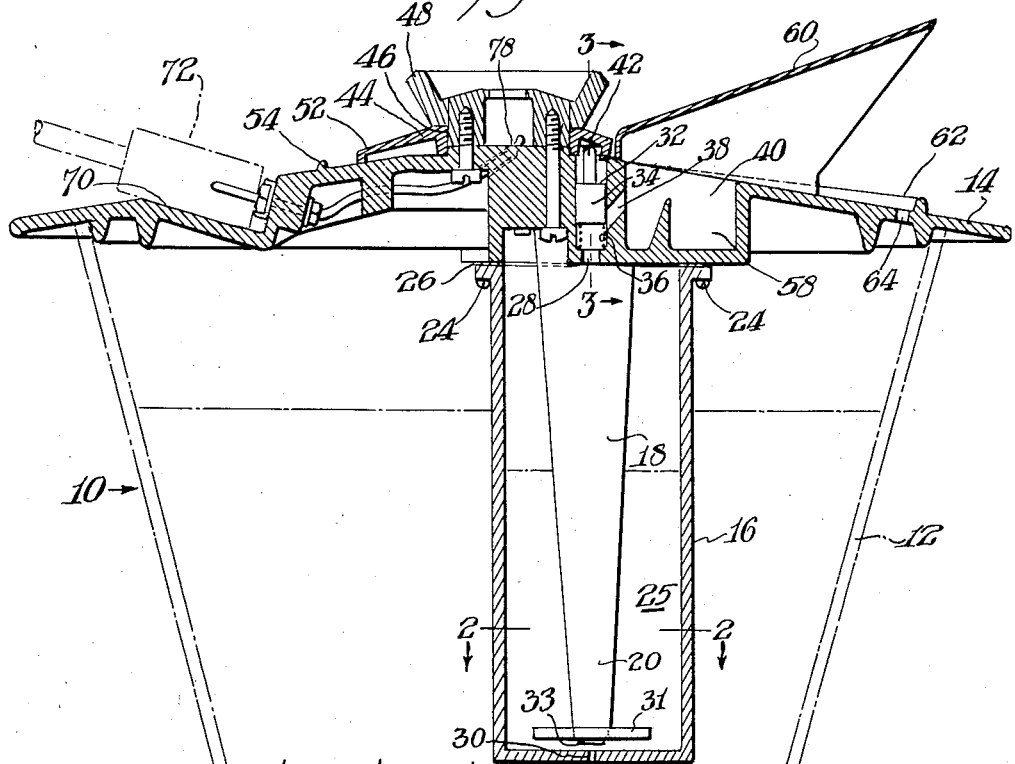
Fig. 1 is a cross-sectional view in elevation of an embodiment of this invention.
Figure 4:
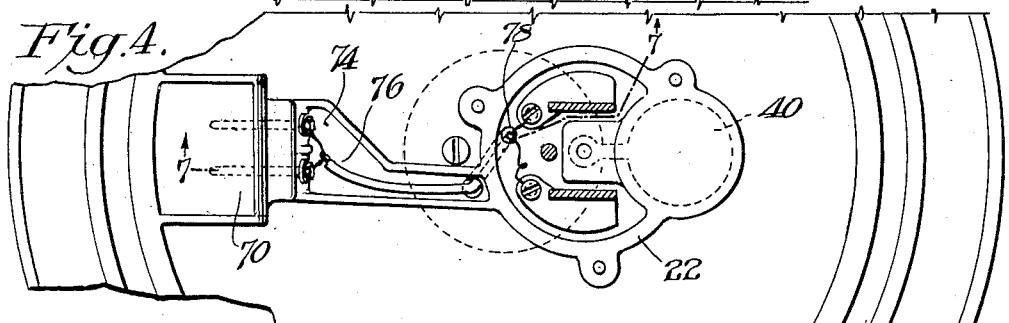
Fig. 4 is a bottom plan view of the cover of the embodiment shown in Fig. 1.

In Fig. 1 is shown an illustrative electrical vaporizer 10 including a base or water reservoir 12 and a cover 14. The base and cover are conveniently made of a material which has insulating properties with respect to both heat and electricity such as glass or a plastic. Parts 12 and 14 may be advantageously made of a strong plastic such as melamine or Bakelite for example. When cover 14 is made of a moldable plastic, the various operative projections and indentations are conveniently formed in the molding operation.

A cup 16 made of a material which does not absorb water and resists corrosion by an electrolyte such as salt up to temperatures in the neighborhood of 250° F., is used for producing the well 16. A useful material for this service is a phenolic composition for example. A pair of electrodes 18, of stainless steel for example, are secured to the central portion of bottom cover 14 and extend downwardly within the cup. The lower portion 20 of these electrodes is tapered to reduce their effective area.

The upper periphery of cup 16 is secured to a corresponding flange 22 on the bottom of cover 14 (Fig. 1) by screws 24 to form a sealed well 25. A gasket 26 of a cork composition, for example, provides a vapor tight seal. A vapor outlet orifice 28 is provided at the top of this well and a water inlet orifice 30 is provided at the bottom. These orifices may be positioned at or near the top and bottom respectively.

Outlet orifice 28 is of an order of size to provide maximum vapor production when fully open. Water inlet orifice 30 is relatively small to help prevent or inhibit cycling upon changes in operating rate, but is large enough to prevent plugging. A suitable vapor outlet orifice, for example, may be as large as 3/16 of an inch in diameter whereas an example of a properly functioning inlet orifice is approximately 0.075 inch in diameter.

Baffle plate 31, of heat resistant plastic impregnated fiber for example, is held in front of orifice 30 to help restrict the flow of water through it. This baffle plate 31 is accordingly mounted on the lower ends 20 of electrodes 18 and retained by bent lugs 33 as shown in Fig. 2.

Figure 3:
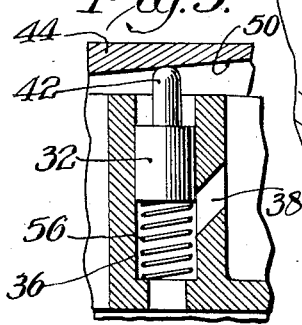
Fig. 3 is an enlarged cross-sectional view of a portion of the embodiment shown in Fig. 1.

A manually operable control valve 32 is incorporated in the central portion of cover 14 overlying vapor outlet orifice 28. This valve 32 is a piston and ported sleeve valve, for example, including a piston 34 and a sleeve 36 which has a diagonal port 38 connecting vapor outlet orifice 28 with vapor discharge chamber 40. Piston 34 includes an upwardly projecting stem 42 which extends above sleeve 36 to engage a control and indicator ring 44, as shown in Fig. 3, which is rotatably mounted on top of cover 14 about the neck 46 of handle 48. Control and indicator ring 44 includes a lower cam surface 50, shown in Figs. 3 and 6, which controls the vertical position of piston 34 and an indicator pointer 52 which cooperates with indicia 54 on the cover of the vaporizer.

Piston 34 and stem 42 are mounted in resilient engagement with cam surface 50 by means of a coil spring 56 which reacts between the bottom of piston 34 and the bottom of sleeve 36. Cam surface 50 and piston 34 are constructed and arranged, for example, to provide a variation in effective size of aperture 38 from fully open to 20% open.

A medicating cup 58 is positioned within the bottom of vapor chamber 40, and the upper portion of chamber 40 is formed by a removable spout 60 conveniently made of plastic, for example. Cover 14 includes a raised ridge or dam 62 which traps moisture condensed upon spout 60 which is drained into reservoir 12 by means of a hole 64. Medicating cup 58 is surrounded by a perforated chamber 66 (Fig. 5) which is drained of condensation by means of holes 68.

Cover 14 also includes a recess 70 for receiving an electric plug 72. A channel 74 is provided in the underside of the cover for receiving electric wires 76 which communicate with electrodes 18 through a hole 78 passing through the cover and communicating with a space 80 under the handle 48 where connection is made to electrodes 18 (Fig. 7).

*Operation*

During normal daytime operation, when reservoir 12 is substantially full of water, the vaporizer will operate at its fastest rate for approximately 6 hours, for example, without refilling. When control ring 44 is turned to the slow position, the effective size of vapor outlet orifice 38 is diminished to approximately 20% of its fully open area which reduces the steam rate and lengthens the operating cycle between refills to approximately 9 hours. A unit of compact size, therefore, provides the relatively high rates of steam or vapor production required during daytime operation, and also can be throttled to permit operation throughout the night without the necessity of refilling.

When the valve 32 is closed, the increase in pressure drives the water level within well 25 below the level of the water in the reservoir. This results in a reduced submergence of the electrodes which accordingly reduces the rate of steam production. If water inlet orifice 30 is unrestricted, the increase in pressure within well 25 can drive all the water out of the well and cut off steam production entirely. The pressure then abruptly drops causing an inrush of water which must be heated before vapor production is resumed. This alternate out- and in-flow with resultant undesirable intermittent vapor production is prevented by restricting the water inlet means as provided by relatively small orifice 30 in conjunction with baffle 31. These elements provide a passageway through the orifice large enough to prevent plugging, but which restricts the flow of water sufficiently to prevent abrupt changes in water level which might intermittently interrupt vapor production.

Smooth control of the vapor production rate is maintained even when the reservoir is nearly empty because the lower portions of electrode 18 are reduced in effective area. This helps compensate for the increase in conductivity caused by the increase in electrolyte concentration which occurs as the water level drops within reservoir 12.

What is claimed is:

1. A device for controlling the rate of vapor discharge by an electrical vaporizer which includes a water reservoir, said device comprising a vertical well inserted within said reservoir, said well including an upper vapor outlet orifice and a lower water inlet means, a pair of electrodes vertically mounted in said well, a manually operable valve means operatively associated with said outlet orifice for concomitantly varying the vapor back pressure and water level in said well, reference indicia operatively associated with said valve for conveniently setting it to preselectable conditions of closure corresponding to predetermined rates of vapor flow, said water inlet means being restricted to inhibit cycling and large enough to prevent plugging, a baffle means is mounted adjacent said water inlet means and within said well to help retard the rate of flow through said water inlet means for preventing abrupt changes of water level within said well, said electrodes terminate a short distance from said orifice, and said baffle means is comprised of a plate which is mounted upon the ends of said electrodes in a position close to said orifice to support said baffle in its operative position and to simultaneously maintain said electrodes separated from each other.

2. A device as set forth in claim 1 wherein said water inlet means includes an orifice approximately .075 of an inch in diameter.

3. A device as set forth in claim 1 wherein said vapor outlet orifice is approximately 3/16 of an inch and said valve provides a range of closure down to 20% of full area.

4. A device for controlling the rate of vapor discharged by an electrical vaporizer which includes a water reservoir, said device comprising a vertical well inserted within said reservoir, said well including an upper vapor outlet orifice and a lower water inlet means, a pair of electrodes vertically mounted in said well, a manually operable valve means operatively associated with said outlet orifice for concomitantly varying the vapor back pressure and water level in said well, reference indicia operatively associated with said valve for conveniently setting it to preselectable conditions of closure corresponding to predetermined rates of vapor flow, said water inlet means being restricted to inhibit cycling and large enough to prevent plugging, said vaporizer including a cover, said valve including a piston and ported sleeve means vertically disposed in said cover, said piston including a stem projecting vertically upward, and a cam surface rotatably mounted upon the upper surface of said cover and engaging said stem for regulating said valve.

5. A device as set forth in claim 4 wherein said manually operable valve includes a control and indicator ring having said cam surface incorporated in its lower surface, and said cover includes a handle which rotatably secures said control and indicator ring to said cover.

References Cited in the file of this patent

UNITED STATES PATENTS

| | | |
|---|---|---|
| 1,723,738 | Lang | Aug. 6, 1929 |
| 1,744,505 | Robinson | Jan. 21, 1930 |
| 2,421,311 | Binnington | May 27, 1947 |
| 2,556,656 | Lohman | June 12, 1951 |
| 2,598,490 | Berg et al. | May 27, 1952 |
| 2,713,628 | Barkin | July 19, 1955 |